United States Patent

[11] 3,584,576

| [72] | Inventors | Keishi Kubo; Kiyoshi Sakai, both of Tokyo, Japan |
|---|---|---|
| [21] | Appl. No. | 753,696 |
| [22] | Filed | Aug. 19, 1968 |
| [45] | Patented | June 15, 1971 |
| [73] | Assignee | Kabushiki Kaisha Ricoh Tokyo, Japan |
| [32] | Priority | Aug. 25, 1967 |
| [33] | | Japan |
| [31] | | 42/54212 |

[54] HEAT-SENSITIVE STENCIL SHEET
2 Claims, No Drawings

[52] U.S. Cl. ..................................... 101/128.2,
117/35.5, 161/251
[51] Int. Cl. ..................................... B41n 1/24,
B41n 15/00

[50] Field of Search........................................... 101/128.2, 128.4; 250/65.1; 117/35.5; 161/251

[56] References Cited
UNITED STATES PATENTS

| 2,808,777 | 10/1957 | Rochkind ..................... | 101/128.2 |
| 3,267,847 | 8/1966 | Hagama et al. ............... | 101/128.2 |

*Primary Examiner*—David Klein
*Attorney*—Woodhams, Blanchard and Flynn

ABSTRACT: A heat-sensitive stencil sheet consisting of a film adhered to a porous thin fibrous sheet and capable of being perforated by exposure to infrared rays, said film consisting essentially of at least 75 percent by weight of a chlorinated polyvinyl chloride resin having at least 20 percent by weight of recurring 1,1-dichloroethylene units, not more than above 7 percent by weight of recurring 1,1-dichloroethylene units and the balance being polyvinyl chloride units.

HEAT-SENSITIVE STENCIL SHEET

SUMMARY OF THE INVENTION

It is, therefore the object of the present invention to provide a heat-sensitive stencil sheet adapted for being thermally processed to provide a perforated stencil sheet and being capable of producing a clearly perforated sheet corresponding to the original image, said stencil sheet comprising a film made with a material containing a chlorinated polyvinyl chloride resin as the principal component thereof, said resin being such that it contains, in its molecular chain, at least 20 per cent by weight, preferably 50 per cent by weight or more, of recurring 1,2-dichloroethylene units, said film being securely adhered to a porous thin paper of the conventional type.

The chlorinated polyvinyl chloride resin film which is employed in the present invention is commercially available and can be manufactured by a known photochlorinating treatment of polyvinyl chloride resins. The chlorinated polyvinyl chloride film is such that at least 20 percent by weight of the molecular chain of said resin is composed of recurring 1,2-dichloroethylene units. According to the present invention, said film is provided in the form of either (1) a resinous film which is made with only such a resin or (2) a resinous film in which is included, as required and by a known process, additives such as a filler, a stabilizer, a plasticizer and/or a coloring agent. In case these additives are included in the film of the chlorinated polyvinyl chloride resin, the desirable amount of said additives included in the film is not greater than 25 percent by weight, preferably 20 percent by weight or less, relative to the weight of the chlorinated polyvinyl chloride resin which constitutes the principal component material of said film.

Ordinary polyvinyl chloride resins, for example, will, when held in air at 375° F., decompose within a period of about 5 minutes due to this heat and will become black in color and then they will vesicate. In contrast to this property of these ordinary resins, the resins which are employed in the present invention will, even where they are used as the single component of the film which is free of any one of the aforesaid additives, develop a secondary transition when these resins are placed under the aforesaid condition, but they do not undergo any heat-decomposition, and accordingly, the films which are made with these resins exhibit a very high durability and a prolonged life. This difference in the property between said ordinary polyvinyl chloride resins and the resins which are employed in the present invention is considered to be due to the fact that said ordinary polyvinyl chloride resins contain a small amount of unstable radicals, while, in the resins which are employed in the present invention, such unstable radicals are conveniently stabilized owing to the photochlorinating treatment to which the latter resins are subjected.

In view of the fact that the resins which are applied to the present invention possess a crystallinity of a certain degree, they present a very sharp melting curve as compared with said ordinary resins. This sharp melting curve which is exhibited by these resins indicates a property of these resins which is markedly useful in obtaining the sheet carrying a clearly perforated image which are formed therethrough, and this clearly perforated image, in turn, is useful in obtaining a clear image of prints. In making a perforated stencil sheet from the heat-sensitive stencil sheet of the present invention which is adapted for being thermally processed to prepare said perforated stencil sheet, the procedure of doing so begins with laying the face of the resinous film of said stencil sheet over the image which is carried on the original and then infrared rays are irradiated onto the resulting laminated sheets from the rear side thereof, i.e. from above the porous thin paper so that the applied infrared rays are absorbed by the image portions which are carried on the original and that the resulting heat of the infrared rays is accumulated in said image portions and also that this heat which has been accumulated in the original image portions is transmitted to the resinous film, serving to melt and produce perforations in the portions of the film corresponding to the original image. During this procedure, the aforesaid property of the resin, or, in other words, the sharp melting curve which this resin exhibits, contributes greatly to making the demarcation lines between the perforated areas and the nonperforated areas extremely distinct. Thus, the employment of the resins which exhibit an increased sharp melting curve will lead to clearer contours of the printed image which may be termed "improved resolving ability" also.

When the resin which is employed in the present invention is considered in respect of this resolving ability, it is desirable that this resin contain 50 percent by weight or more of recurring 1,2-dichloroethylene units in its molecular chain. The resins which are employed in the present invention contain the undesirable 1,1-dichloroethylene units only in amounts ranging from 2 percent to 7 percent or less. It is to be noted also that said desirable property of the resins which are applicable to the present invention are not influenced only by the factors, i.e., the 1,1-dichloroethylene to 1,2-dichlorothylene content ratio and the chlorine content, but that the structural elements and the molecular weight of these resins also constitute important factors of determining their property.

In the following Table 1 are shown some of the examples of the physical properties and the compositions of the typical crude resin specimens consisting of chlorinated polyvinyl chloride which contains at least 20 percent by weight of recurring 1,2-dichloroethylene units in the molecular chains thereof.

TABLE 1

| Specimen: | Chlorine content (percent by weight) | Density (25° C.) | Fusing temperature* (° C.) | Flow temperature (° C.) |
| --- | --- | --- | --- | --- |
| A | 60.4 | 1.46 | 107 | 151 |
| B | 62.4 | 1.49 | 117 | 153 |
| C | 65.2 | 1.58 | 145 | 176 |
| D | 70.6 | 1.63 | 183 | 220 |
| E | 71.9 | 1.66 | 186 | 234 |

*Fusing temperature is about 15° C. higher than the generally so-called second order transition point.

As has been described above, according to the present invention, there is provided a heat-sensitive stencil sheet adapted for use in the preparation of a perforated stencil sheet, by dint of the selective use of the particular type of resins, especially chlorinated polyvinyl chloride resins, such that they allow the formation of extremely clear perforations in the films made with such a resin as infrared rays are irradiated onto the stencil sheet, without the fear of the occurrence of any heat decomposition of said resin, and also by dint of having each of these films lined with a known porous thin paper which is made of either natural fibers such as Mitsumata, paper mulberry and manila hemp, synthetic fibers such as rayon, polyvinyl alcohol and acrylonitrile fibers, or a mixture of natural and synthetic fibers.

DESCRIPTION OF THE PREFERRED EMBODIMENTS

The present invention will hereunder be described in further detail in connection with some of the embodiments of the present invention.

Example 1

Using a material consisting of a mixture of 90 parts by weight of a chlorinated polyvinyl chloride resin having the composition and the properties as indicated in connection with the Specimen C in Table 1, 2 parts by weight of a stabilizer consisting of dibasic lead phthalate, 5 parts by weight of a plasticizer consisting of 2,2'-diethylhexylphthalate, 0.01 part by weight of a coloring agent consisting of Lake Red C and 10 parts by weight of a filler consisting of silica powder, there was prepared a film of 12μ in thickness by using on the inflation process, such as disclosed in U.S. Pat. Nos. 3,231,642 and 3,217,359. This film was lined with a porous thin paper made of natural fibers and having a thickness of 48μ(9.6 gr./m.²). Thus, a heat-sensitive stencil sheet for use in the preparation of a perforated stencil sheet was obtained.

An original carrying images on both sides thereof was laid on the face of said film thus obtained, and infrared rays coming from an infrared ray lamp provided with a reflector plate were irradiated onto the assembly consisting of said stencil sheet and said original from above the porous thin paper. This irradiation was performed in such a way that the assembly consisting of said stencil sheet and said original was slid beneath said infrared ray lamp at the travelling speed of 40 mm./sec. to effect the so-called sliding slit exposure. As a result, the portions of the film corresponding to the portions of the image carried on the original were melt-perforated, and thus, a perforated stencil sheet was obtained. This resulting perforated sheet was applied onto a commercially available rotary stencil machine to perform printing. As a result, there were obtained extremely distinct printed images which represented faithful reproductions of the image of the original. At the end of the printing of more than 2000 times, there was noted no appreciable reduction in the clarity of this reproduction.

Example 2

Using a chlorinated polyvinyl chloride resin having the same composition and properties as those of the Specimen D in Table 1 and in a manner similar to that described in connection with Example 1, there was prepared a film of 12μ in thickness. This film was lined with a porous thin paper made with synthetic fibers containing rayon fibers. Thus, a heat-sensitive stencil sheet for use in the preparation of a perforated stencil sheet was obtained. The perforated stencil sheet obtained in a manner similar to that described in Example 1 from the stencil sheet thus obtained was subjected to printing on a rotary stencil machine, with the result that a very distinct printed image was obtained. At the end of printing which was repeated more than 2000 times, there was noted no appreciable decrease in the clarity of the obtained printed images.

Example 3

Using 90 parts by weight of a chlorinated polyvinyl chloride resin having the same composition and properties as those of the Specimen E in Table 1 and also using additives in amounts same as that employed in Example 1 (the total amount of the additives included being 17.01 parts by weight) and in a manner similar to that described in Example 1, there was prepared a perforated stencil sheet. This stencil sheet was subjected to printing on a rotary stencil machine, with the result that a very clear printed image was obtained. At the end of more than 2000 times of repeated printing, no appreciable deterioration of the clarity of the printed images was noted.

We claim:

1. In a heat-sensitive stencil sheet comprising a film consisting of at least 75 percent by weight of a synthetic resin, said film being bonded to a porous thin fibrous sheet, the improvement in which said synthetic resin is chlorinated polyvinyl chloride containing at least about 20 percent by weight of recurring 1,2-dichloroethylene units, not more than about 7 percent by weight of recurring 1,1-dichloroethylene units and the balance being polyvinyl chloride units.

2. A heat-sensitive stencil sheet according to claim 1 in which said film contains up to 25 percent by weight of additives selected from the group consisting of fillers, stabilizers, plasticizers and coloring agents.